March 24, 1936.  J. W. SMITH  2,035,203

METHOD OF AND APPARATUS FOR FEEDING FUEL

Filed Feb. 21, 1934

INVENTOR
John W. Smith
BY
Herbert S. Fairbanks
ATTORNEY

Patented Mar. 24, 1936

2,035,203

UNITED STATES PATENT OFFICE 2,035,203

METHOD OF AND APPARATUS FOR FEEDING FUEL

John W. Smith, Overbrook Manor, Pa.

Application February 21, 1934, Serial No. 712,275

13 Claims. (Cl. 299—107.6)

The efficient operation of the compression ignition engine depends on maintaining the required period for injection for each working stroke throughout the entire speed range from 200 R. P. M. to 3600 R. P. M. Heretofore, the efficient operation of the compression ignition engine has been confined to a speed range from 600 R. P. M. to 1800 R. P. M. which represents a three to one speed range.

A normal period for fuel injection is 20° of crank shaft rotation, therefore, if a one hole nozzle is required for 600 R. P. M. a three hole nozzle would be required for 1800 R. P. M.

It is not practical to increase the pressure to maintain a 20° injection period throughout the speed range. Three thousand pounds per square inch may be considered a normal pressure for injection. To maintain a 20° period for injection at 1800 R. P. M. would require an impracticable injection pressure of twenty seven thousand pounds per square inch. Therefore, any of the conventional forms of fixed orifice or fixed number of holes in a nozzle would result in injection lag at a speed of 1800 R. P. M. and at 600 R. P. M. an excess of fuel must be injected to get penetration.

My apparatus and method for fuel injection eliminates injection lag throughout the entire speed range of 18 to 1, and maintains, throughout the entire range, correct penetration.

Conventional automatic spray valves have been employed, and in most cases proved to be inefficient as compared to the multiple hole nozzle or the fixed orifice nozzle. The chief objection was lack of penetration.

One eighth of an inch diameter of the valve seat would be considered a small diameter for the conventional automatic spray valve for a cylinder having 50 cubic inch displacement. The circumference at the valve seat represents the width of the orifice which would be over three eighths of an inch. The spray would be too thin for penetration, as a matter of fact, if the required amount of fuel is injected at 200 R. P. M. engine speed, there would be no kinetic energy in the spray. The liquid would merely drip from the end of the valve. To secure penetration an excess amount of fuel would be used, fuel economy would be poor, followed by cloudy exhaust, and, for the above reasons, automatic spray valves have not met with success.

With the foregoing in view, my invention comprehends a novel method of and apparatus for injecting liquid fuel into the combustion chamber with the required amount of penetration and proper atomization for the entire range of engine speed.

It further comprehends a novel method of forcing a predetermined quantity of liquid through an orifice, controlling the size of the orifice by the injection pressure, and controlling the atomization and penetration by the degree of expansion at the valve seat.

It further comprehends a method of injecting liquid fuel which consists of forcing the fuel through an orifice the size of which is dependent upon the degree of valve opening, and the liquid fuel is released at the valve seat at the required pressure and period of crank shaft rotation.

It further comprehends a novel method of injecting liquid fuel which consists in releasing the fuel at the required pressure in one or more jets which control the dimensions of the spray, and permit the spray to freely expand in a radial direction, and controlling the spray penetration and atomization by the width of the valve seat and of the orifice.

Other novel features of construction and advantage and steps of the method will hereinafter clearly appear in the detailed description and the appended claims.

For the purpose of illustrating the invention I have shown in the accompanying drawing typical embodiments of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Similar numerals indicate corresponding parts.

Figure 1:
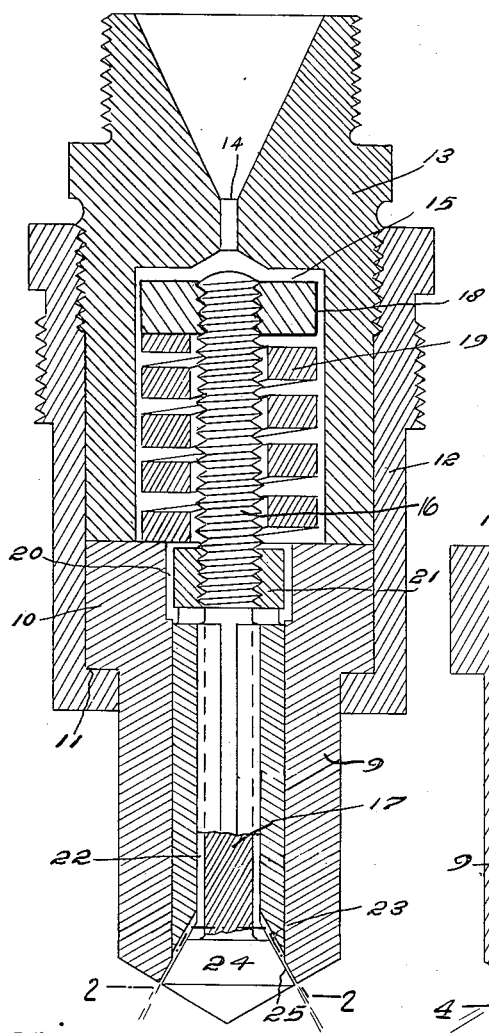
Figure 1 is a sectional elevation of an apparatus for injecting liquid fuel, and by the use of which my method can be carried out in practice.
Figure 2:
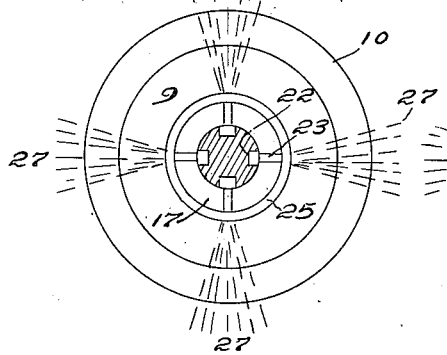
Figure 2 is a transverse section taken on line 2—2 of Figure 1.

Referring first to the embodiment seen in Figures 1 and 2; 9 designates a valve casing having an enlarged head 10 which engages a shoulder 11 in a housing 12, externally threaded to facilitate its assembly with an engine cylinder. A nut 13 in threaded engagement with the housing retains the valve casing against the shoulder 11 and is provided with a fuel inlet port 14 leading to a chamber 15. 16 designates a valve stem secured to the valve piston 17 by a nut 21. The valve stem 16 is threaded to receive a nut 18 for adjusting the tension of the spring 19 which controls the pressure of the fuel at the moment of injection. The spring 19 is interposed between the nut 18 and the valve casing. The casing 9 is recessed at 20 to provide a fuel passage and clearance for a nut 21 which bears against the valve piston 17. The space 20 communicates with circumferentially spaced fuel inlet passages 22 formed in the wall of the valve piston and leading to the orifices 23 which terminate at the valve seat 25. In Figure 1, the valve 24 and the orifice are cone shaped and the seating face of the valve tapers rearwardly and inwardly.

Any desired numbers of sprays may be employed at any desired angle to meet the requirements for various degrees of turbulence and combustion chamber design. In Figure 2, four sprays are disclosed, while, in Figures 3 and 4, two sprays are employed, and, in Figures 5 to 8, a single spray is disclosed.

Figure 3:
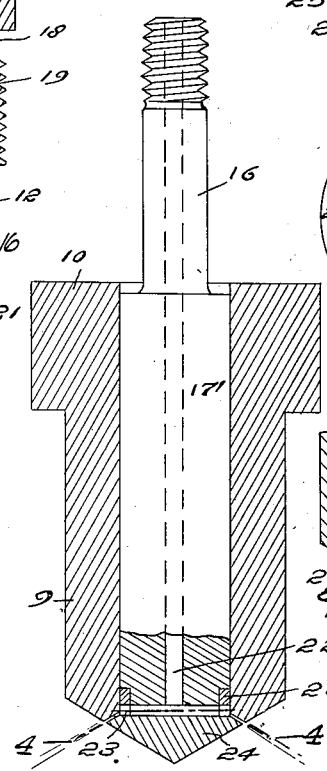
Figure 3 is a sectional elevation of another embodiment of my invention.
Figure 5:
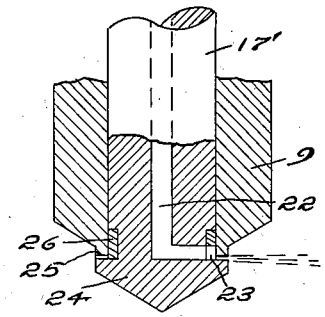
Figure 5 is a sectional elevation of another embodiment of my invention.
Figure 6:
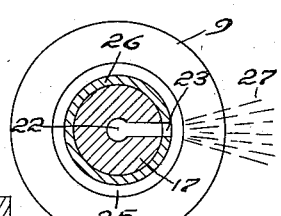
Figure 6 is a transverse section taken on line 6—6 of Figure 5.
Figure 7:
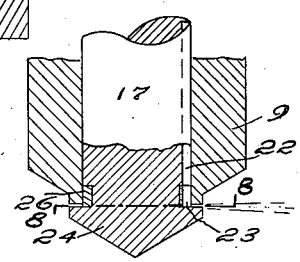
Figure 7 is a sectional elevation of another embodiment of my invention.
Figure 8:
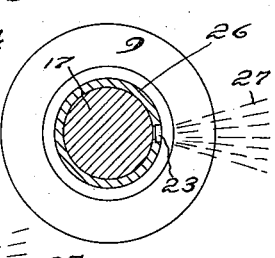
Figure 8 is a transverse section taken on line 8—8 of Figure 7.
Figure 4:
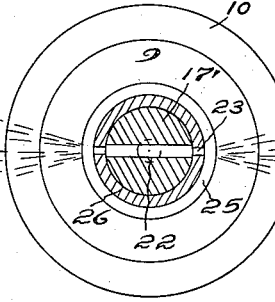
Figure 4 is a transverse section taken on line 4—4 of Figure 3.

In Figures 3, 4 and 5, the fuel inlet is wholly within the walls of the piston 17', while, in Figure 7, it is in the form of a slot or groove. The sleeve 17 in Figure 1 and the insert 26 in Figures 3, 5 and 7 are for the purpose of facilitating the manufacture of the valve seat and orifice.

For fifty cubic inch cylinder displacement, two orifices, as shown in Figures 3 and 4, would be suitable. The width of orifice 23 would be .015 inch, and the thickness of the spray would depend upon the speed of the engine ranging from .001" to .015". The correct turbulence for the two point radial injection is 10 to 1, that is, the air in the combustion chamber would rotate ten revolutions to one revolution of the engine crank shaft. If a four point radial injection is used, a five to one turbulence would be used.

Spray characteristics are important, and, in my method, the spray is free to expand in a radial direction, as indicated at 27. The amount of expansion is limited by the width of the valve seat 25. A normal width for the valve seat 25 would be .015". The spray penetration may be reduced to any desired point by increasing the width of valve seat which would have the effect of expanding the spray around the circumference. By increasing the width of orifice 23 the fuel will be more finely atomized.

The width of the valve seat 25 and the width of the orifice 23 will control the features of atomization or penetration. The depth of penetration and degree of atomization may be worked out for any desired form of combustion chamber.

The liquid fuel is fed under pressure to the fuel inlet 14, and the valve opens as the injection pressure increases above the tension to which the spring has been adjusted. The fuel is released at the orifice anterior to the valve seat. The spray expands radially but its thickness is restricted by the opening between the valve and the valve seat so that its expansion on two sides is restricted. The orifice can, therefore, in a sense, be considered as a compound orifice wherein, posterior to the releasing point of the fuel, there are two open sides, and two closed sides, which latter are formed by the valve face and the valve seat.

Having thus described my invention what I claim as new and desire to secure by Letters Patent is:—

1. The method of injecting liquid fuel at the required pressure into a combustion chamber of an internal combustion engine, which consists in forcing a predetermined quantity of liquid fuel through a discharge orifice, and controlling the size of said orifice by the injection pressure.

2. The method of injecting liquid fuel at the required pressure into a combustion chamber of an internal combustion engine, which consists in forcing a predetermined quantity of liquid fuel through a valve controlled discharge orifice, and controlling the atomization and penetration by the degree of expansion at the valve seat and controlling the area of the orifice by the injection pressure.

3. The method of injecting liquid fuel at the required pressure into a combustion chamber of an internal combustion engine, which consists in forcing a predetermined quantity of liquid fuel through a plurality of circumferentially spaced discharge orifices to discharge the fuel into the combustion chamber in the form of circumferentially spaced fan shaped sprays, and controlling the size of each orifice by the injection pressure.

4. The method of injecting liquid fuel into a combustion chamber of an internal combustion engine at the required pressure for the entire range of engine speeds, which consists in forcing liquid fuel through a variable discharge orifice, and eliminating injection lag throughout the entire range of engine speed by controlling the size of the orifice by the injection pressure.

5. The method of injecting liquid fuel at the required pressure into a combustion chamber of an internal combustion engine, which consists in forcing liquid fuel through a discharge orifice having a circumferentially selected location, controlling the size of the orifice by the injection pressure, leaving the spray free to expand in a radial direction, and restricting the thickness of the spray.

6. In a fuel admission device for internal combustion engines, a valve casing having a valve seat, a valve piston in the casing cooperating with said valve seat, a fuel discharge orifice terminating at the valve seat in such a manner as to provide a variable area orifice the size of which is dependent upon the degree of valve opening, and means to control the valve piston to release liquid fuel at the valve seat at the required pressure and period of crank rotation.

7. In a fuel admission device for internal combustion engines, a casing and a valve piston contributing to form a fuel discharge orifice anterior to and terminating at the seat of the valve piston in such a manner as to provide a variable area orifice, and resilient means cooperating with the casing and valve piston to control the injection pressure.

8. In a fuel admission device for internal combustion engines, a casing and a valve piston contributing to form a plurality of fuel discharge orifices and terminating anterior to the seat of the valve piston the size of said orifices being constant circumferentially but variable in direction of the movement of the valve piston, and means to utilize the injection pressure to control the size of said orifices.

9. In a fuel admission device for internal combustion engines, a casing having a valve seat and a valve piston contributing with the casing to form a fuel discharge orifice terminating at the valve seat, with the spray free to expand radially but having its expansion at two sides restricted by the valve piston and its valve seat.

10. In a fuel admission device for internal combustion engines, a casing having a valve seat, and a valve piston contributing with the casing to form a fuel discharge orifice terminating at the valve seat in such a manner as to form a variable area orifice, the width of the valve seat controlling the spray penetration.

11. In a fuel admission device for internal combustion engines, a casing having a valve seat, and a valve piston contributing with the casing to form a fuel discharge orifice terminating at the valve seat, the width of the orifice controlling the atomization and the size of the orifice being varied by the movement of the valve piston.

12. In a fuel admission device for internal combustion engines, a casing having a valve seat, and a valve piston contributing with the casing to form a variable fuel discharge orifice, the width of the orifice and of the valve seat controlling spray atomization and penetration and the size of the orifice being varied by the movement of the valve piston.

13. In a fuel admission device for internal combustion engines, a casing having a valve seat, and a valve piston contributing with the casing to form a variable fuel discharge orifice, with the spray free to expand in a radial direction, the amount of such expansion being controlled by the width of the valve seat and the size of the orifice being controlled by movement of the valve piston.

JOHN W. SMITH.